Figure 1:
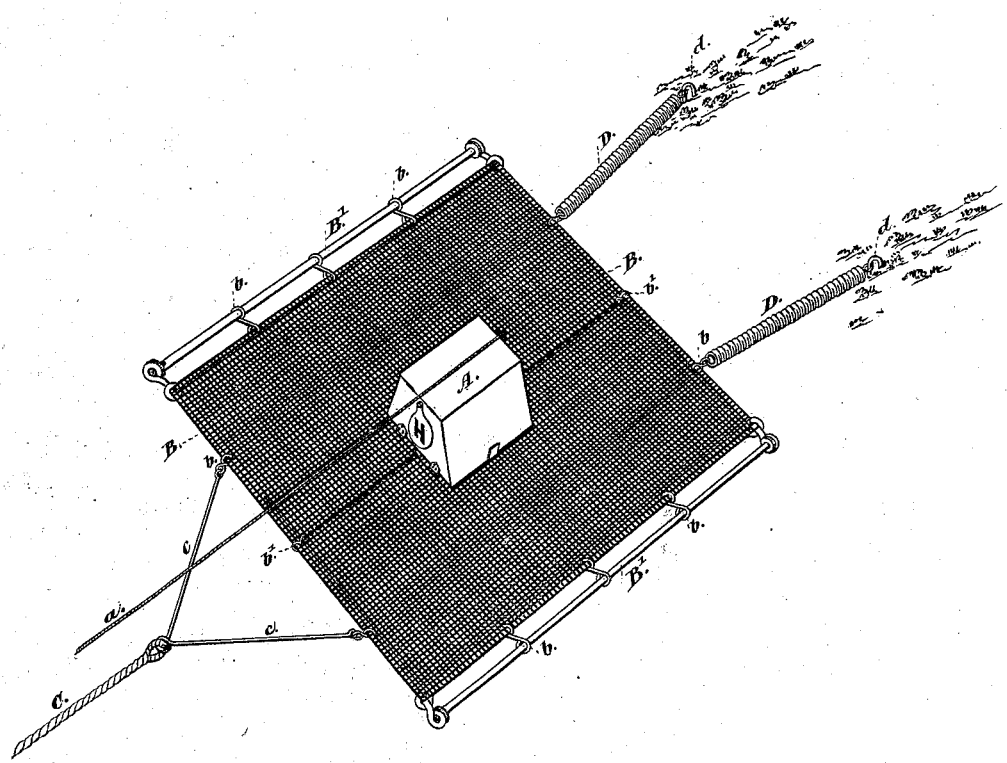

T. H. MARSH.
Pigeon-Traps.

No. 149,496.

Patented April 7, 1874.

UNITED STATES PATENT OFFICE.

T. HERBERT MARSH, OF TORONTO, CANADA.

IMPROVEMENT IN PIGEON-TRAPS.

Specification forming part of Letters Patent No. 149,496, dated April 7, 1874; application filed March 16, 1874.

*To all whom it may concern:*

Be it known that I, THOMAS HERBERT MARSH, of the city of Toronto, in the Province of Ontario, Canada, have invented an Agitator to be used in shooting pigeons and other birds from the trap, of which the following is a specification:

My invention relates to pigeon and bird shooting from the trap; and consists of a frame made of wire-cloth or other suitable material, in connection with suitable springs, in the center of which frame the trap containing the bird is placed, the object being to force birds which do not rise when the trap is thrown open to take wing.

A is an ordinary H shooting-trap, the trap being shown as closed and fastened in the center of the frame B by the light chains $b'$. The frame B is made in the present case of a square shape, of wire-cloth, sewed or woven on a strong skeleton frame, whose front and rear bars are of stiff wire, connected at each end by a pliable wire cord. Of course it will be understood that I do not confine myself to a square frame made of wire-cloth, as any shape and material can be used which may be found more suitable or convenient. B' are detachable side stays, of iron or other suitable material, connected to the frame B by S-links $b$. The ends of the front and rear rods of the skeleton frame are turned into eyes, into which are fitted the ends of the side stays B', the stays B' being held in position by a pin and collar. The object of this arrangement is, that by detaching the stays B' the frame B may be rolled up in a small compass, for convenience of carriage when the shooting is over. C is a cord, connected at one end to the front of frame B by suitable-shaped links $c$, the other end being held in the hand of an attendant. D D are spiral springs, connected at one end to the rear of frame B, the other end being linked on the staples $d$, which are driven securely into the ground. $a$ is the string by which the trap A is thrown open.

The operation of my agitator is as follows: The frame B is placed flat on the ground. A is the trap containing the bird put on the center of it, and secured in place by the light chains $b'$. When the trap is thrown open, should the bird refuse to rise at once, by pulling the string C, which runs forward to the firing-ground, the frame B, with the bird on it, is drawn forward, and the springs D distended to any extent which may be thought necessary. By letting the string go suddenly the springs D quickly contract, jerking the frame B suddenly from under the feet of the bird and throwing it on its side, causing it at once to take wing.

The advantages of my invention are that, should a bird not rise, through tameness or other reason, upon the trap being thrown open in the ordinary way, it is forced to take wing.

I claim as my invention—

An agitator for pigeon-traps, consisting of the frame B, with or without the side stays B', connected by spiral springs D, or their equivalent, to the stationary staples $d$, and manipulated by the string C, arranged to operate, in connection with a trap, substantially as described, and for the purpose specified.

T. HERBERT MARSH.

Witnesses:
 GEO. A. AIRD,
 HUGH AIRD.